Oct. 18, 1938.     J. W. AYERS     2,133,267
BLACK OXIDE OF IRON AND PROCESS FOR MAKING THE SAME
Filed Jan. 24, 1934
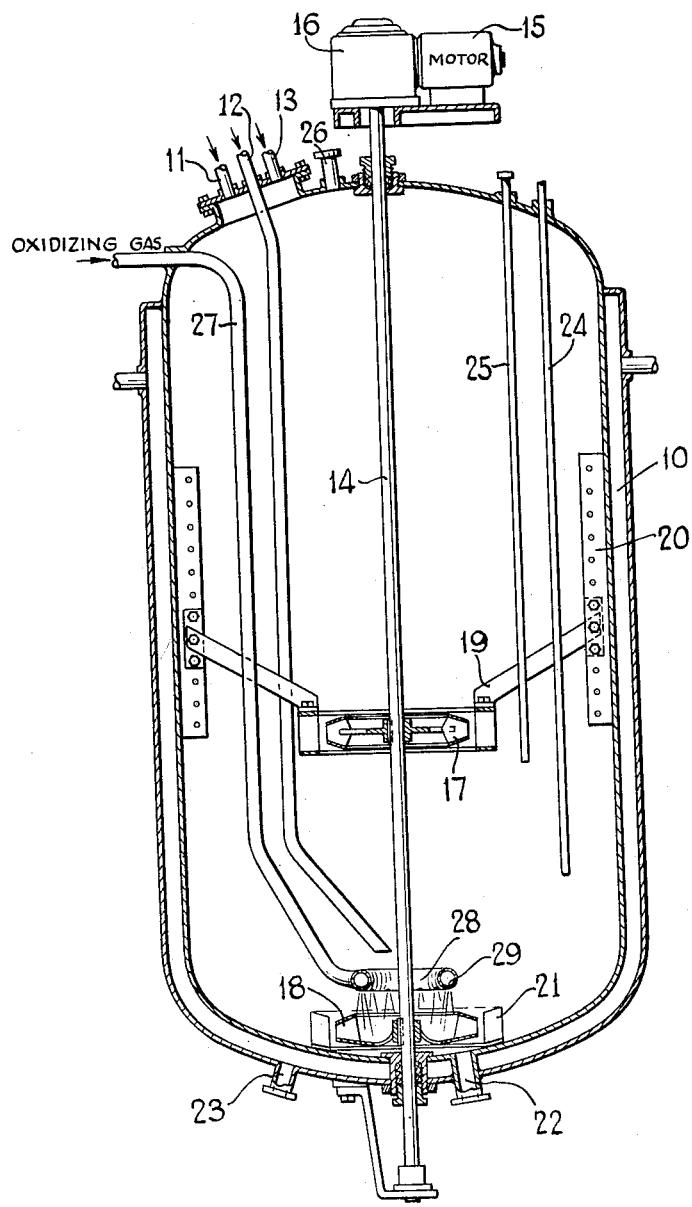
INVENTOR
Joseph W. Ayres
BY
ATTORNEYS Patented Oct. 18, 1938

2,133,267

UNITED STATES PATENT OFFICE 2,133,267

BLACK OXIDE OF IRON AND PROCESS FOR MAKING THE SAME

Joseph W. Ayers, Easton, Pa., assignor to C. K. Williams & Co., Easton, Pa., a corporation of Pennsylvania Application January 24, 1934, Serial No. 708,034

25 Claims. (Cl. 134—59)

This invention relates to a black oxide of iron particularly suitable as a pigment, and to processes of producing the same.

According to certain prior processes of producing black oxide of iron pigments, it has been customary to proceed by preparing a dilute solution of ferrous sulfate in an open tank, adding sodium carbonate and heating to a boiling temperature or lower temperature, while introducing a stream of air. The oxygen of the introduced air and also that in the atmosphere contacting the surface of the mass both oxidize the ferrous iron. This treatment is continued until the desired degree of oxidation is reached as well as can be estimated, which when supplemented by the oxidation to occur during drying produces the proper ratio of ferrous oxide to ferric oxide as represented by the formula $FeO.Fe_2O_3$. Whereas, this prior process produces usable pigments, the inability to regulate the degree of oxidation in any one batch and the variations in color, texture, particle size, etc., between successive batches, has been highly objectionable to the manufacturer and to the trade.

Attempts have been made to overcome these difficulties by employing ammonia instead of sodium carbonate followed either by oxidizing in the cold over a prolonged period or by oxidizing to an extent which produces yellow ferric hydrate, reducing by the addition of more ammonia and heating under a slight pressure until the desired ratio of ferrous oxide to ferric oxide is obtained. These processes produce products which are unstable and lacking in uniformity between batches, or, are uneconomical.

In my copending application Serial No. 650,998 filed January 10, 1933, of which the present application is a continuation-in-part I have described a process which overcomes the objectionable features of the prior processes to a substantial degree. Briefly the application describes a process of producing black oxide of iron in which a ferrous salt is precipitated from solution by the addition of a solution of sodium carbonate or other alkaline material, after which the resulting precipitate is oxidized by maintaining the mass at certain temperatures and under superatmospheric pressure in the presence of air or other oxygen containing gas until the oxidation to the black oxide stage is complete. The process requires a shorter operating period than similar prior processes, gives higher yields and produces a pigment having a better texture, color, stability and uniformity than prior black oxide pigments. Although this prior process produces an excellent product, the objects of the present invention are to provide a black oxide pigment of still higher quality including a higher degree and better balance of tinting strength and color, and a greater uniformity of particle size. Further objects are to obtain increased efficiency of the process including higher yields of oxide in lesser periods of time.

It has now been discovered that the rate of precipitation of the ferrous compound from solution has a decided effect upon the properties of the final product produced. If the rate of precipitation is fast the tinting strength is high, and slowing up of the rate decreases this strength. As the rate of the precipitation decreases there is a notable improvement in color which becomes clearer, brighter and blacker. Therefore an additional feature of the present invention involves adjusting and controlling the rate of precipitation of the ferrous compound to obtain the proper balance of tinting strength and color.

An additional discovery which enables the present process to lead to superior products is the effect of the rate of oxidation upon the final product. As the rate of oxidation increases the color improves. The rate however, must be carefully controlled to avoid over-oxidation of the oxide, into the brown or red pigment class.

The improved results therefore may be attributed particularly to the increased rate of precipitation of the ferrous compound and to the greater speed of the oxidation, but not solely thereto, for the more uniform contact of the oxidizing gas with the slurry and the use of an alkali hydroxide as the precipitating agent instead of the carbonate preferred in my prior process, each has its beneficial effect.

The accompanying drawing illustrates somewhat diagrammatically a vertical section of an autoclave or kettle in which the present process may be very successfully carried out. Although the present process might be carried out in other apparatus, it should be understood that such other apparatus must provide means for uniformly contacting a regulated quantity of compressed air or other oxidizing gas with the slurry containing the precipitated ferrous compound.

With reference to the drawing, there is illustrated an autoclave having a jacket 10 suitable for heating by means of superheated steam. A number of inlets 11, 12 and 13 for the introduction of the various chemicals used in the process are connected most suitably into the top of the autoclave. In the center there is an agitating means consisting of a shaft 14 driven by motor 15 and gears 16, and having attached thereto within the kettle a pair of turbine wheels 17 and 18, the latter being situated substantially at the bottom thereof. The turbine wheel 17 is surrounded by bracketed vanes 19 attached to the vanes 20 mounted on the walls of the autoclave. A series of vanes 21 are mounted in the bottom of the autoclave surrounding the turbine wheel 18. All of these vanes prevent excessive swirling and cause more vertical movement of the slurry.

The turbine wheels are of a construction which when rotated draw the slurry into the center of the kettle and force the same out from the periphery of the wheels, and are so arranged that in addition to agitation, they cause the liquid mass to flow vertically. The combination of these movements produces uniform contact between the oxygen introduced and the ferrous compound.

The bottom of the autoclave is provided with an outlet tube 22 through which the slurry is removed after completion of the treatment. At the bottom of the jacket 10 there is the usual outlet 23 for the removal of condensed steam. A thermometer well 24 projects into the autoclave from the top thereby permitting a check upon the temperature from time to time. The top also contains a sampling tube 25 projecting into the center portion of the autoclave to permit periodic testing of the contents and ascertainment of the progress or completion of the process. An automatic pressure release valve 26 adapted to prevent pressures in excess of the desired amount from building up is mounted also in the top of the autoclave. For the introduction of air or other oxidizing gas a tube 27 extends into the autoclave and terminates near its bottom in an annular conduit 28 having perforations 29 through which the oxidizing gas passes into contact with the ferrous compound circulated past it.

In carrying out the process of the instant invention a solution of a ferrous salt from a storage tank or other source is introduced into the autoclave through the inlet 11. The degree of dilution of the solution is of considerable importance to the success of the process, for if too concentrated solutions are employed, the slurry during the subsequent treatment becomes so thick that proper agitation and uniform oxidation cannot be obtained, and if too dilute solutions are used, the yield per batch is lowered and the efficiency of the process as a whole lowered. Satisfactory solutions in general are those having a gravity of from about 14° to 26° Baumé but somewhat higher or lower gravity solutions may be employed depending upon the degree of dilution of the alkaline mass added and the temperature employed during the oxidation treatment.

If the solution of the ferrous salt introduced is too concentrated, as normally would be the case if taken from storage, water is added through the inlet 13 until the desired degree of dilution is reached.

The solution is then heated to a temperature from 125° to 200° F. by means of steam or other heating fluid introduced into the jacket 10. The temperature employed affects the rate of precipitation of the ferrous compound from the solution and therefore must be regulated if products of fine texture are to be obtained. When the solution reaches the desired temperature, a solution of an hydroxide or carbonate of an alkali metal or of ammonia is introduced through the inlet 12 and discharged into the autoclave at a point just above the turbine wheel 18 rotating at a predetermined speed.

The rate at which the alkaline solution is introduced and the speed of the turbine wheel are correlated so as to obtain intimate and uniform contact. Inasmuch as the viscosity or specific gravity of the slurry subjected to the subsequent oxidation treatment should be for efficient operation within certain limits dependent upon the construction or capability of the apparatus, the concentration of the alkaline solution must be correlated to the concentration of the ferrous salt solution in the autoclave. With the salt solution gravities hereinbefore given, the gravity of the hydroxide solution should be from about 20° to 40° Baumé.

When the introduction of the hydroxide is complete the valves are closed and the mass heated to temperatures suitably of from about 220° to 290° F. During this time the vapor pressure is permitted to build up to from about 40 to 100 pounds per square inch. Temperatures substantially in excess of the maximum given tend to produce a quantity of red oxide in the product and thus should be avoided. The amount of pressure above the minimum is not of such great importance so long as the oxidizing gas is introduced at a sufficiently fast rate. Higher pressures, however, require stronger and more costly apparatus and also a gas compressor of greater capacity.

While the temperture and pressure is maintained at the above mentioned levels, a stream of air or other oxidizing gas is introduced through the inlet tube 27 and is discharged through the perforations 29 in the annular tube 28 into the flowing slurry drawn into the center of the rotating turbine wheel 18, the speed of which is suitably maintained at about 90 revolutions per minute.

This treatment is continued for a period of about 2 to 4 hours depending upon the rate of the oxygen supply, the viscosity or gravity of the solution and the effectiveness of the agitation. The proper time for any particular batch is determined by testing samples withdrawn from time to time through the tube 25. A period of two hours is usually sufficient.

The slurry is then removed from the autoclave through the outlet 22 and finally washed, dried and pulverized.

In contrast to prior similar procedures the instant process does not require that the product be dried under particular carefully controlled conditions, for the oxidation has reached a stable point when the treatment in the autoclave is terminated. The pulverization employed is not one which reduces the size of precipitated particles, but it merely breaks up the clusters of precipitated particles formed during the drying operation.

In accordance with a preferred method of carrying out the process of the present invention, an aqueous solution of 3200 pounds of ferrous sulfate ($FeSO_4.7H_2O$) is introduced from storage into a kettle or autoclave of 2000 gallon capacity, the gravity of the solution being between 23° or 25° Baumé. The solution, having too high a concentration, is diluted to a 15° Baumé concentration by the addition of the calculated amount of water. Before closing the exhaust valves of the kettle, the solution is heated to a temperature of 125° F. and while at this temperature, 992 pounds of an aqueous solution of sodium hydroxide, having a Baumé gravity between 40 and 42 degrees are introduced during constant agitation, at a rate of about 100 pounds per minute.

After the introduction of the hydroxide solution is complete, the valves on the kettle are closed and heat is applied until a temperature of about 250° F. is reached. During this increase in temperature, the pressure is permitted to increase to about 60 pounds superatmospheric whereupon air is introduced into the body of the solution until the oxidation of the ferrous compound into the ferrosoferric oxide condition is complete. A treatment of two hours is usually sufficient to accomplish this result. The treated mass after removal from the kettle is filtered to separate the oxide from the solution, the oxide then being dried and pulverized.

To obtain pigment of uniform quality it is necessary that the oxidation be uniform throughout the whole body of the slurry. Consequently, it is necessary that an agitation be effected which will uniformly contact the mass with the oxygen introduced. By closing the kettle from atmospheric oxygen and introducing air in controlled quantities, the present process results in uniform products not producible by apparatus heretofore used employing open vessels. Furthermore, the oxidation treatment can be carried out for a definite period of time. To insure greater uniformity a portion of the solution may from time to time be withdrawn and tested to determine whether the oxidation has proceeded exactly to the $FeO.Fe_2O_3$ stage.

In practice of the present process, a yield is obtained close to that amount theoretically obtainable from the quantity of the ferrous salt employed, the only losses occurring being those resulting from the unavoidable small deposits in the pipe lines, settling tanks, etc. In the apparatus hereinbefore described having a 2000 gallon capacity, the maximum yield per batch is about 1500 pounds of oxide. It is possible to obtain higher yields, but high concentrations of the ferrous salt increase the viscosity of the slurry to such a point that it is difficult to handle the mass in the kettle. When attempts to obtain more than 1500 pounds of oxide per batch are made, the operation is not as efficient because of the additional time necessary to accomplish the oxidation.

The black oxide pigment produced by the present invention is of an especially fine texture having a uniformly fine particle size of from about 0.30 to 0.60 microns and a high tinctorial value. It has a true blue black color and a clear and clean undertone. Because of its freedom from any corrosive chemicals, which are often used in the production of pigments, the present oxide is stable to sunlight and other weathering conditions.

In accordance with another embodiment of the invention, 570 pounds of hydrated ferrous sulfate ($FeSO_4.7H_2O$) dissolved in 300 gallons of water together with 285 pounds of sodium carbonate dissolved in 114 gallons of water are introduced into an additional 400 gallons of water, preferably contained in an autoclave. A precipitate of ferrous carbonate forms almost instantaneously, which precipitate is then heated to the slightly elevated temperature of 122° F. under a simewhat elevated pressure in the autoclave of about 50 pounds per square inch, during agitation for a period of approximately one-half hour. Next, air or other oxygen-containing gas is introduced into the autoclave and the treatment continued at a pressure of from 50 to 130 pounds per square inch, preferably averaging about 100 pounds per square inch and at a temperature of from 122 to 347° F., preferably of 302° F. These conditions are maintained until withdrawn samples on analysis show the absence or substantial absence of carbonate, usually after two and one-half hours of oxidizing treatment. The precipitate removed consisting substantially of only ferroso-ferric oxide is then preferably, but not necessarily, washed with a very dilute solution of hydrochloric acid or other mineral acid to remove any last traces of ferrous carbonate retained on the surface of the ferroso-ferric oxide particles after which it is washed with water, filtered, dried and finally pulverized. The average diameter of the black oxide particles produced is about 0.4 microns.

An excess of alkali of about 20% usually leads to a product of a superior color, but less than 20% excess may be used with advantage.

It should be understood that the instant invention is not limited to the detailed description of the process and apparatus hereinbefore given, but that it includes all modifications or equivalent materials capable of use coming within the general scope of the invention and within the scope of the appended claims.

I claim:

1. The process of producing black oxide of iron comprising adding a solution of a hydroxide of an alkali metal to a heated solution of a ferrous salt, heating the resulting mass to a temperature in excess of 212° F. under superatmospheric pressure, introducing an oxygen-containing gas during agitation until the oxidation to the black oxide condition is complete.

2. The process of producing black oxide of iron comprising adding a solution of an alkali to a ferrous salt solution in a quantity sufficient to completely precipitate the ferrous content of the solution, maintaining the precipitated compound at a temperature of from about 220° to 290° F. under superatmospheric pressure while introducing a stream of oxidizing gas during agitation until oxidation to the $FeO.Fe_2O_3$ stage is complete.

3. The process of producing black oxide of iron comprising heating a solution of a ferrous salt to a temperature of from about 125° to 190° F., adding a solution of a hydroxide of an alkali metal during agitation, maintaining the resulting mass at a temperature above 212° F. under superatmospheric pressure while introducing a stream of oxidizing gas until the oxidation to the black oxide condition is complete.

4. The process of producing black oxide of iron comprising precipitating ferrous hydroxide from a solution of a ferrous salt and treating the resulting liquid mass to oxidize the ferrous hydroxide into ferroso-ferric oxide by heating it to a temperature of from about 220° to 290° F. under a superatmospheric pressure of several atmospheres, and while maintaining the mass under these conditions, introducing a stream of oxidizing gas during agitation until the oxidation to the black oxide stage is complete.

5. The process of producing black oxide of iron comprising heating a solution of a ferrous sulfate, adding a solution of sodium hydroxide in a quantity in excess of that theoretically necessary to react with the ferrous sulfate present, heating the resulting mass to a higher temperature of from about 220° to 290° F. under superatmospheric pressure of about 40 to 100 pounds per square inch, and introducing a blast of air 6. A black oxide of iron pigment having true blue black color and a uniformly fine particle size of from about 0.30 to 0.60 microns.

7. The process of producing black oxide of iron comprising mixing a solution of a ferrous compound with a solution of an alkali, heating the resulting mass to a temperature of from 122 to 347° F. under superatmospheric pressure while introducing oxygen at a rate to effect rapid oxidation and continuing such treatment until the $FeO.Fe_2O_3$ stage is reached.

8. The process of producing black oxide of iron comprising heating a solution of a ferrous compound, adding a solution of an alkali, heating the resulting mass under superatmospheric pressure to a temperature of from 220° to 290° F. and simultaneously introducing air during agitation until the oxidation to the black oxide stage is complete.

9. The process of producing black oxide of iron for use as pigment comprising, subjecting precipitated ferrous carbonate to an elevated temperature in excess of about 122° F. and superatmospheric pressure in the presence of oxygen, said pressure being of sufficient magnitude to improve the properties of the product obtained, good conditions being maintained until the formation of $FeO.Fe_2O_3$ is complete.

10. The process of producing black oxide of iron comprising reacting a ferrous salt while in solution with a solution of an alkaline carbonate, subjecting the resulting precipitate to an elevated temperature in excess of about 122° F. and a pressure of several atmospheres in the presence of oxygen until the mass is free of carbonate and $FeO.Fe_2O_3$ is formed.

11. The process as described in claim 25, wherein the pressure employed is from 50 to 130 pounds per square inch.

12. The process as described in claim 25, wherein the temperature employed averages about 302° F. and the pressure averages about 100 pounds per square inch during the reaction period.

13. The process as described in claim 25 wherein the precipitation is effected with the use of an excess of an alkali metal agent.

14. The process of producing black iron oxide comprising reacting a ferrous salt solution with an excess of alkali metal carbonate solution, agitating the resulting precipitate at a temperature averaging about 302° F. and at a pressure averaging about 100 pounds per square inch in an atmosphere containing oxygen until the precipitated product is susbtantially free of carbonate.

15. The process as described in claim 14 wherein the ferrous salt employed is ferrous sulphate.

16. The process as described in claim 14 wherein sodium carbonate in an excess of about 20% is used.

17. The process as described in claim 14 wherein black oxide precipitate formed is washed with dilute mineral acid, washed, dried and pulverized.

18. The process of producing black oxide of iron comprising reacting a ferrous salt solution with an alkaline carbonate precipitating agent, agitating the resulting precipitate at a slightly elevated temperature and pressure for a period of about one half hour, increasing the temperature to an average of about 302° F. and the pressure to an average of about 100 pounds per square inch in the presence of oxygen and maintaining such conditions until the precipitated product is substantially free of carbonate and $FeO.Fe_2O_3$ is obtained.

19. The process as described in claim 18 wherein the precipitating agent is sodium carbonate and the same is used in excess.

20. The process of producing black oxide of iron which comprises precipitating a ferrous compound from a solution of a ferrous salt by means of an alkali precipitating agent selected from the group consisting of the hydroxides and carbonates of the alkali metals and ammonia and introducing oxygen into the resulting mass during agitation while heating the same to a temperature of from about 220 to 290° F., the mass during the oxidation being maintained under superatmospheric pressure, said oxidation treatment being continued until the $FeO.Fe_2O_3$ stage is reached.

21. The process of producing a black oxide of iron comprising precipitating a ferrous compound from a solution of a ferrous salt by means of a solution of an alkali at a rate to produce optimum balance of tinting strength and color, and heating the resulting precipitate to a temperature of from 122 to 347° F., in an aqueous alkaline solution during agitation under superatmospheric pressure in the presence of oxygen until $FeO.Fe_2O_3$ is obtained.

22. The proces of producing black oxide of iron comprising subjecting a ferrous compound which has been precipitated by the action of a solution of an alkali upon a ferrous salt to an oxidizing treatment including heating to a temperature of from 122 to 347° F., under superatmospheric pressure during agitation while introducing a stream of an oxygen containing gas, such treatment being discontinued when the oxidation to the black oxide stage is complete.

23. In the production of black oxide of iron by oxidation of an alkali precipitated ferrous compound at temperatures of from 122–347° F., the step consisting of effecting the oxidation under substantial pressure until $FeO.Fe_2O_3$ is formed.

24. The process of producing black oxide of iron comprising oxidizing a ferrous compound precipitated in an aqueous alkali solution by subjecting the compound to a superatmospheric pressure and a temperature in excess of about 122° F., in an atmosphere containing oxygen, said pressure being of sufficient magnitude to improve the properties of the product produced, said oxidizing conditions being maintained until the $FeO.Fe_2O_3$ stage is reached.

25. The process of producing black oxide of iron comprising treating a ferrous salt solution with a solution of an alkali, subjecting the resulting precipitate to an elevated temperature of from about 122 to 347° F., and to a pressure of several atmospheres in the presence of oxygen until the $FeO.Fe_2O_3$ stage is reached, whereby black iron oxide is formed.

JOSEPH W. AYERS.